Sept. 4, 1923.
L. CIPRA
1,466,930
JOURNAL BEARING
Filed Dec. 12, 1921
2 Sheets-Sheet 1
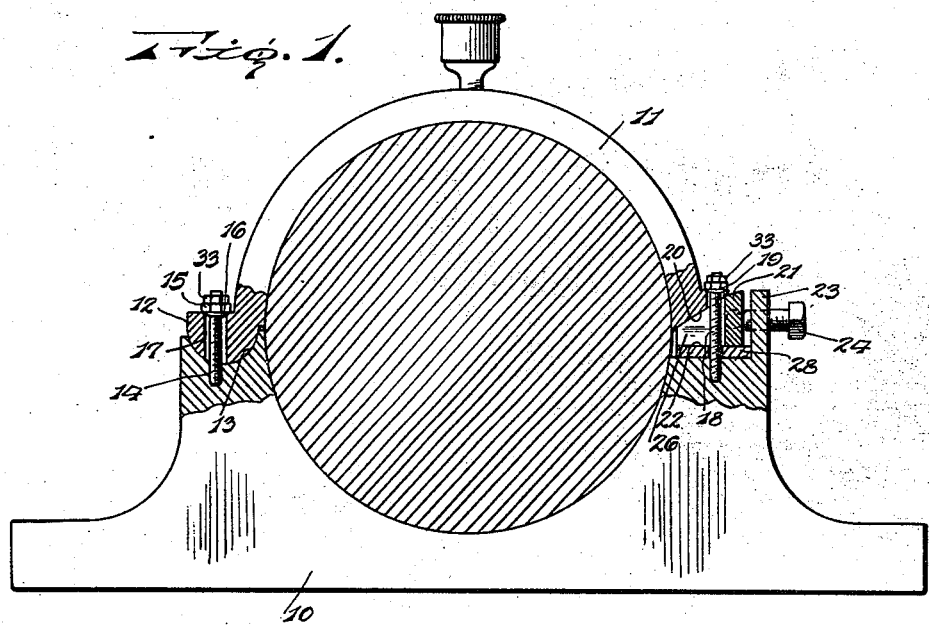
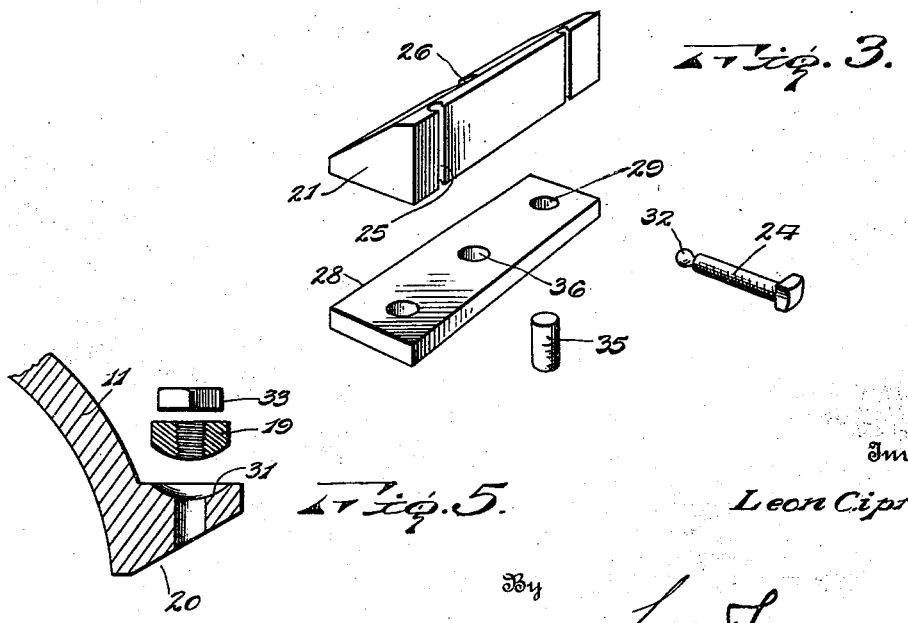
Inventor
Leon Cipra.
By Lacey & Lacey, Attorneys Sept. 4, 1923.
L. CIPRA
1,466,930
JOURNAL BEARING
Filed Dec. 12, 1921
2 Sheets-Sheet 2
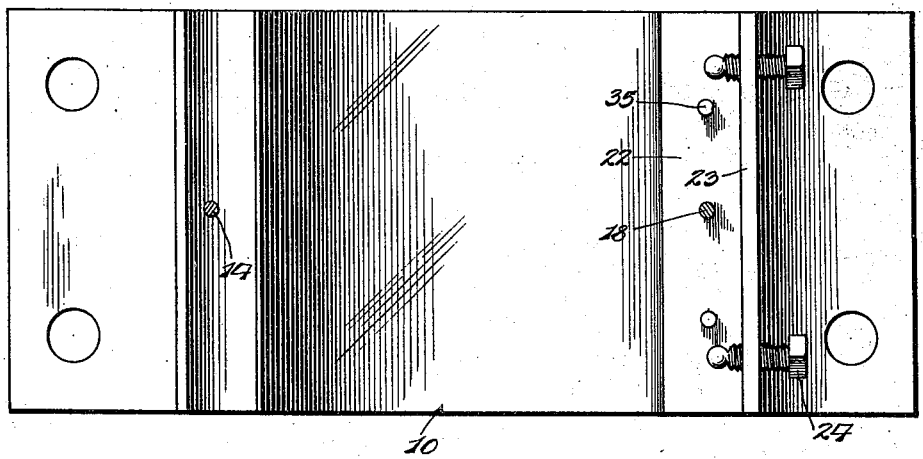
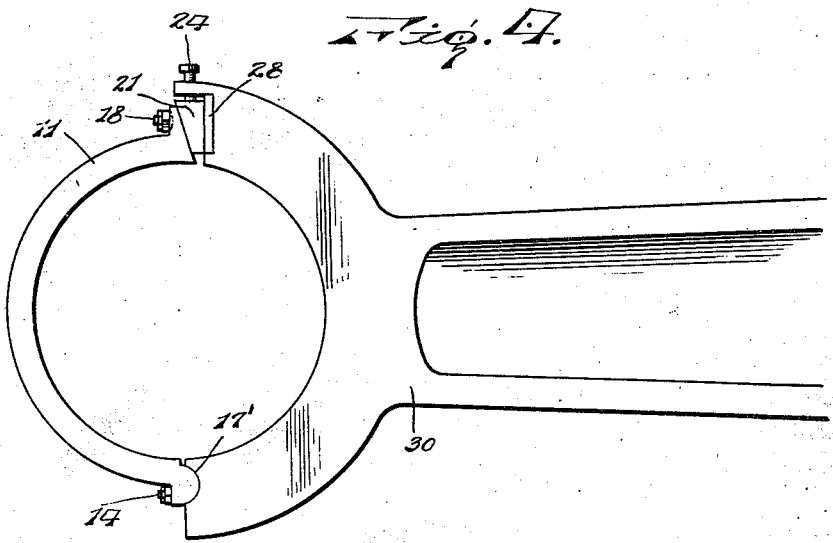
Inventor
Leon Cipra
By Lacy & Lacy, Attorneys Patented Sept. 4, 1923.

1,466,930

UNITED STATES PATENT OFFICE.

LEON CIPRA, OF KANOPOLIS, KANSAS.

JOURNAL BEARING.

Application filed December 12, 1921. Serial No. 521,720.

*To all whom it may concern:*

Be it known that I, LEON CIPRA, citizen of the United States, residing at Kanopolis, in the county of Ellsworth and State of Kansas, have invented certain new and useful Improvements in Journal Bearings, of which the following is a specification.

My invention relates to bearings for journals on crank shafts or line shafts and its main object is to provide an easy adjustment in bearings of this class, for taking up wear of the journals or their liners.

In ordinary bearings of this character, it is usual to remove the caps, while making the adjustment, which generally consists in removing or replacing shims in the bearing boxes.

One of the objects of this invention is now to construct the bearing in such manner, that the finest adjustment may be made without the removal of the cap from the box or block, and another object is to entirely dispense with shims, thereby saving considerable time necessary for trying shims of different thicknesses, until a suitable one has been found for making the proper adjustment.

In the accompanying drawings, one embodiment of the invention has been illustrated and:

Figure 1 shows an end view, partly in section, of a bearing with my improved device installed, Figure 2 is a plan view of a bearing box or block, Figure 3 is a perspective view of some of the details, Figure 4 is a side view of a crank shaft with my improved device installed, and Figure 5 shows a cross section of one end of the bearing cap.

In the drawings, the reference numeral 10 denotes the bearing box or block with the cap 11. The hinge end of the cap is provided with a convex cylindrical portion 12 along its entire edge and the box 10 is provided with a corresponding concave recess 13. This arrangement takes the place of the ordinary hinge for the cap and permits a slight raising or swinging of the cap around the axis of the cylindrical surface. A stud bolt 14 is secured in the box and has a nut 15 threaded on the free end of the stud. The lower face of the nut 15 is spherical to fit in the spherical cup or seat 16 provided in the cap 11 and sufficient play is allowed around the bolt 14 in the hole 17 provided in the cap, to permit a slight oscillation or swinging of the cap 11 in its bearing when the nut 15 has been loosened. A lock nut 33 is provided for securing the nut 15 on the stud 14.

The other side of the cap is held down by a similar bolt 18 and nut 19 engaging with its spherical face in the cup 31, but the lower face of the cap 11 along this edge is beveled, as at 20, to fit along the upper surface of a wedge 21. A seat 22 is formed in the bearing box 10 for this wedge and a ledge 23 forms the outer wall of the seat. A pair of set screws 24 are threaded in the ledge 23 and are intended to engage with their spherical ends 32 in the grooves 25 running vertically in the perpendicular rear face of the wedge 21 so that the screws can press the wedge in radial direction inward in its seat or retract it. The wedge may consequently be put in position or removed, without taking out the screws 24. It extends the whole length of the bearing box and has a recess 26 through which the stud 18 runs.

Between the lower face of the wedge 21 and the seat 22 I preferably insert a plate 28 provided with a pair of holes 29 registering with the studs 35 and a central hole 36 for the stud bolt 18. This plate is only used when the bearing is first assembled, when it forms a base for the wedge 21 and prevents dirt from collecting around the wedge. When the journal or the bearing becomes worn, this plate 28 may be dispensed with to permit the movement of the wedge in the direction from the ledge 23 for readjusting the bearing. The construction illustrated in Figure 4, is similar to that shown in Figure 1; that is to say, the same cap 11, wedge 21, set screws 24, securing bolts 14 and 18, and cylindrical hinge 17', are used. But, in this case, instead of a bearing box 10, the head of the pitman 30 has been shaped to accommodate the cap and related parts, as described above.

The advantage of the cylindrical connection between the cap and the box is to always keep the cap in alinement and correct position over the journal.

In order to adjust the bearing for wear of the journal, the nuts 33, 15 and 19 are first loosened enough to release the tight grip on the wedge 21. The advantage of the play in the holes 17 for the studs 14 and 18, will now be understood as it is possible to raise the right hand end of the cap, as seen in Figure 1, while the wedge 21 is reset. If it is now found that the plate 28 is too thick to permit of sufficient adjustment, it is simply removed from the bearing and the wedge 21 retracted after the set screws have been unscrewed. The cap 11 is now let down over the journal again and the set screws slightly drawn up, thereby advancing the wedge toward the center of the bearing, and when a correct adjustment has been found, the nuts 15 and 19 are again screwed down on the studs 14 and 18.

Having thus described the invention, what is claimed as new is:

1. In a journal bearing having a box, a cap, and means for securing the cap on the box; a laterally slidable wedge inserted between said cap and box, said cap having a beveled surface adapted to engage said wedge, a seat being provided for said wedge in said box, a ledge on the box having threaded apertures, and set screws for said wedge engaging said apertures, said means comprising studs on said box, spherically faced nuts threaded on said studs, corresponding seats for the nuts and holes for the studs being provided in said cap.

2. In a journal bearing having a box, a cap, and means for securing the cap on the box; a laterally slidable wedge inserted between said cap and box, said cap having a beveled surface adapted to engage said wedge, a seat being provided for said wedge in said box, a ledge on the box having threaded apertures, and set screws for said wedge engaging said apertures, said means including cylindrical inter-engaging surfaces on said cap and said box along one edge of the cap, permitting a limited swinging motion of said cap.

3. In a journal bearing having a box, a cap and means for securing the cap on the box; a laterally slidable wedge inserted between said cap and box, said cap having a beveled surface adapted to engage said wedge, a seat being provided for said wedge in said box, a ledge on the box having threaded apertures, and set screws for said wedge engaging said apertures, said means comprising studs on said box, spherically faced nuts threaded on said studs, corresponding seats for the nuts and holes for the studs being provided in said cap, and cylindrical inter-engaging surfaces on said cap and said box along one edge of the cap, permitting a limited swinging motion of said cap.

In testimony whereof I affix my signature.

LEON CIPRA. [L. S.]